United States Patent
Higashinaka

(10) Patent No.: US 9,203,656 B2
(45) Date of Patent: Dec. 1, 2015

(54) RECEIVER AND METHOD OF ESTIMATING FREQUENCY RESPONSE OF TRANSMISSION PATH BY RECEIVER

(71) Applicant: MITSUBISHI ELECTRIC CORPORATION, Chiyoda-ku (JP)

(72) Inventor: Masatsugu Higashinaka, Chiyoda-ku (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

(21) Appl. No.: 14/418,591

(22) PCT Filed: Jun. 5, 2013

(86) PCT No.: PCT/JP2013/003518
§ 371 (c)(1),
(2) Date: Jan. 30, 2015

(87) PCT Pub. No.: WO2014/024369
PCT Pub. Date: Feb. 13, 2014

(65) Prior Publication Data
US 2015/0207647 A1 Jul. 23, 2015

(30) Foreign Application Priority Data

Aug. 8, 2012 (JP) ................................. 2012-175539

(51) Int. Cl.
H03D 1/04 (2006.01)
H04L 25/02 (2006.01)
H04J 11/00 (2006.01)
H04L 27/01 (2006.01)
(Continued)

(52) U.S. Cl.
CPC .............. *H04L 25/022* (2013.01); *H04J 11/00* (2013.01); *H04L 5/0048* (2013.01);
(Continued)

(58) Field of Classification Search
CPC .................... H04L 5/0048; H04L 27/2675

USPC .......................................................... 375/346
See application file for complete search history.

(56) References Cited

U.S. PATENT DOCUMENTS 5,307,376 A * 4/1994 Castelain et al. .............. 375/260
6,185,408 B1 * 2/2001 Leopold et al. .............. 455/12.1
(Continued)

FOREIGN PATENT DOCUMENTS

JP       05-075568 A     3/1993
JP       3044899 B2      5/2000
JP       2005-311413 A   11/2005

OTHER PUBLICATIONS

International Search Report issued Jul. 2, 2013 in PCT/JP2013/003518 filed Jun. 5, 2013.

*Primary Examiner* — Santiago Garcia
(74) *Attorney, Agent, or Firm* — Oblon, McClelland, Maier & Neustadt, L.L.P.

(57) ABSTRACT

A receiver that estimates a frequency response of a transmission path using a first pilot signal stored in advance and a second pilot signal received, the receiver includes an electric power information calculation means that calculates electric power information of the first pilot signal for each subcarrier, a coefficient calculation means that calculates a coefficient on the basis of comparison between the electric power information and a predetermined threshold, a multiplication means that multiplies the electric power information of the first pilot signal for each subcarrier by a corresponding coefficient calculated by the coefficient calculation means, a transmission path estimation means that calculates an estimation value of a frequency response of a transmission path on the basis of the first pilot signal multiplied in the multiplication means and the second pilot signal received from a transmitter, and an interpolation processing means that performs interpolation processing for the calculated estimation value.

10 Claims, 5 Drawing Sheets

(51) Int. Cl.
*H04L 5/00* (2006.01)
*H04L 27/26* (2006.01)

(52) U.S. Cl.
CPC ....... *H04L 25/0224* (2013.01); *H04L 25/0232* (2013.01); *H04L 27/01* (2013.01); *H04L 27/2647* (2013.01); *H04L 27/2675* (2013.01)

(56) References Cited

U.S. PATENT DOCUMENTS

| | | | |
|---|---|---|---|
| 6,529,850 B2 * | 3/2003 | Wilborn et al. | 702/142 |
| 7,778,357 B2 * | 8/2010 | Alcouffe | 375/316 |
| 2005/0030926 A1 * | 2/2005 | Qian et al. | 370/335 |
| 2005/0073949 A1 * | 4/2005 | Hayashi | 370/208 |
| 2005/0238109 A1 * | 10/2005 | Koga et al. | 375/260 |
| 2006/0008037 A1 * | 1/2006 | Chang et al. | 375/346 |
| 2007/0025460 A1 * | 2/2007 | Budianu et al. | 375/260 |
| 2007/0201351 A1 * | 8/2007 | Egashira et al. | 370/208 |
| 2008/0227423 A1 * | 9/2008 | Kaikkonen et al. | 455/337 |
| 2010/0172427 A1 * | 7/2010 | Kleider et al. | 375/260 |
| 2010/0189202 A1 * | 7/2010 | Imao | 375/344 |
| 2011/0149929 A1 * | 6/2011 | Kleider et al. | 370/338 |
| 2014/0119225 A1 * | 5/2014 | Hasegawa | 370/252 |

* cited by examiner

RECEIVER AND METHOD OF ESTIMATING FREQUENCY RESPONSE OF TRANSMISSION PATH BY RECEIVER

TECHNICAL FIELD

The present invention relates to a method of estimating a frequency response of radio transmission path in frequency domain equalization in a receiver.

BACKGROUND ART

As a demodulation technique in digital radio communication, frequency domain equalization has been well known. In the frequency domain equalization, a frequency response of a radio transmission path is estimated by a receiver and signal distortion undergone through a transmission path is compensated, and then the signal is demodulated. Therefore, a transmission path estimation technique is required by which a frequency response of a radio transmission path can be estimated with high precision.

As a conventional transmission path estimation technique, for example, there exists a technique featuring OFDM (Orthogonal Frequency Division Multiplexing) described in Patent Document 1. In Patent Document 1, a method is disclosed in which a transmitter transmits a known pilot, signal arranged at a regular interval in a frequency domain, and a receiver 1 compares a pilot signal stored in advance with the received pilot signal so as to estimate the transmission path of the frequency domain.

Note that, since the pilot signal is transmitted at a regular interval in the frequency domain, the receiver only estimates transmission path responses of the frequencies at which the pilot signal is transmitted. Further, in the method disclosed in Patent Document 1, the IDFT (Inverse Discrete Fourier Transform) is applied to the estimated transmission path responses so as to convert them once into estimated transmission path values in a time domain, and then the estimated transmission path values are multiplied by a window function and again converted into a frequency domain signal by using the DFT (Discrete Fourier Transform) so that transmission path responses of the frequencies at which the pilot signal is not transmitted are interpolated.

Patent Document 1: Japanese Patent Publication. No. 3044899

SUMMARY OF THE INVENTION

Problems to be Solved by the Invention

However, in the technique disclosed in Patent Document 1, in a case where a signal whose frequency characteristic is not flat is used as the pilot signal, there has been a problem in that transmission path estimation with high precision cannot be performed and communication quality is degraded. The present invention has been made to overcome the problem described above and a purpose thereof is that, even in a case where the pilot signal whose frequency characteristic is not flat is used, the frequency response of the transmission path can be estimated with high precision and high communication quality can be obtained by a receiver that employs frequency domain equalization.

Means for Solving the Problems

The invention relates to a receiver that estimates a frequency response of a transmission path using a first pilot signal stored in advance and a second pilot signal, and the receiver includes: an electric power information calculation means that calculates electric power information of the first pilot signal for each subcarrier; a coefficient calculation means that calculates a coefficient on the basis of comparison between the electric power information and a predetermined threshold; a multiplication means that multiplies the electric power information of the first pilot signal for each subcarrier by a corresponding coefficient calculated by the coefficient calculation means; a transmission path estimation means that calculates an estimation value of a frequency response of a transmission path on the basis of the first pilot signal multiplied in the multiplication means and the second pilot signal received from a transmitter; and an interpolation processing means that performs interpolation processing for the calculated estimation value.

Effect of the Invention

In the invention, by calculating the estimation value of the frequency response on the basis of the electric power information of the pilot signal for each subcarrier stored in advance, even in a case where the pilot signal whose frequency characteristic is not flat is used, the frequency response of the transmission path can be estimated with high precision, and high communication quality can be obtained by the receiver 1 that employs the frequency domain equalization.

MODES FOR CARRYING OUT THE INVENTION

Embodiment 1

Figure 1:
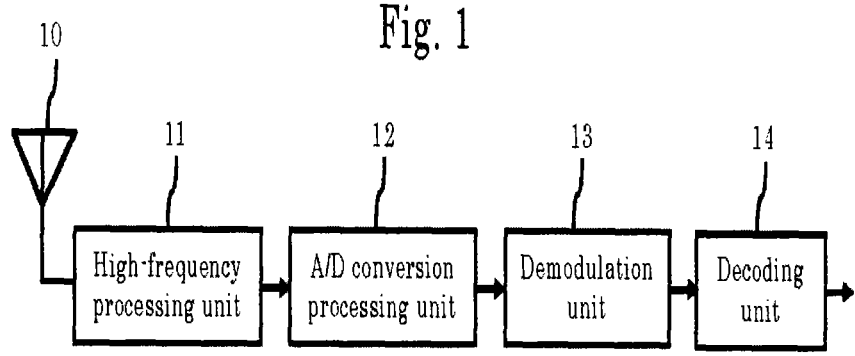
FIG. 1 is an overall block diagram of a receiver 1 according to Embodiment 1.

FIG. 1 is an overall block diagram of a receiver 1 according to Embodiment 1 of the present invention. In FIG. 1, numeral 10 denotes an antenna, numeral 11 denotes a high-frequency analog signal processing unit, numeral 12 denotes an A/D conversion processing unit, numeral 13 denotes a demodulation unit that is a distinguishing portion in the receiver 1 according to the present embodiment, and numeral 14 denotes a decoding unit.

Next, an overall operation of the receiver 1 will be described in reference to FIG. 1. When receiving a high-frequency analog signal by the antenna 10, the receiver 1 carries out prescribed processes such as a filtering process and a down-conversion process in the high-frequency processing unit 11, and then delivers the received signal to the A/D conversion processing unit 12. The A/D conversion processing unit 12 converts the input analog signal to a digital signal and delivers the signal to the demodulation unit 13. The demodulation unit 13 carries out a later-described demodulation process and delivers the demodulation result to the decoding unit 14. The decoding unit 14 decodes an error correction code applied in the transmitter, to thereby obtain data.

Figure 2:
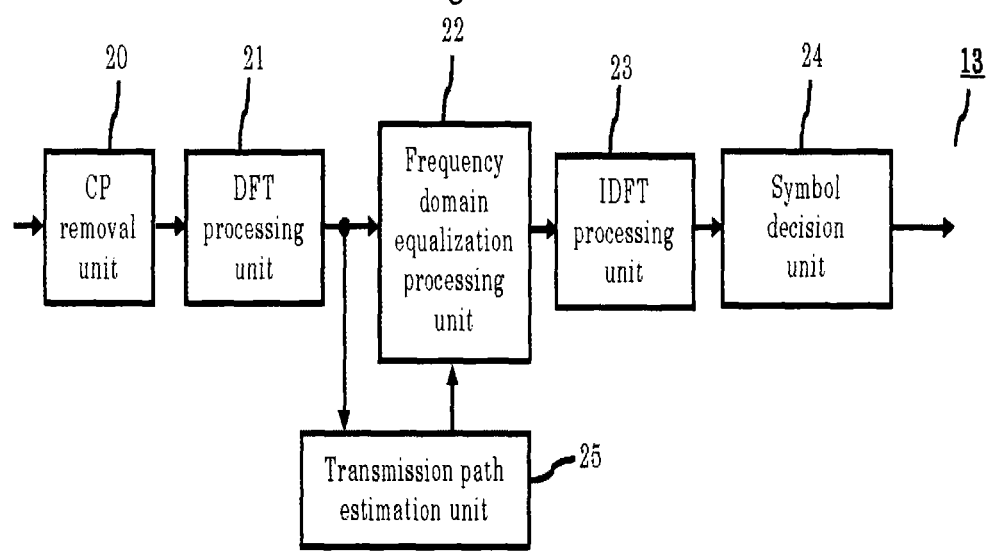
FIG. 2 is a block diagram of a demodulation unit 13 according to Embodiment 1.

FIG. 2 is a block diagram of the demodulation unit 13 according to Embodiment 1 of the present invention. In FIG. 2, numeral 20 denotes a CP (Cyclic Prefix) removal unit, numeral 21 denotes a DFT (Discrete Fourier Transform) processing unit, numeral 22 denotes a frequency domain equalization processing unit, numeral 23 denotes an IDFT (Inverse Discrete Fourier Transform) processing unit, numeral 24 denotes a symbol decision unit, and numeral 25 denotes a transmission path estimation unit that is a distinctive feature in the present embodiment.

Figure 3:
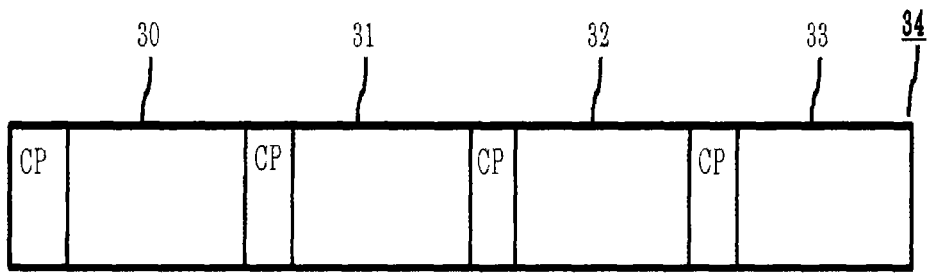
FIG. 3 shows a frame format and a configuration of transmission blocks according to Embodiment 1.

Note that, in the present embodiment, a single carrier block transmission is assumed to be adopted in which a plurality of transmission symbols is gathered to form a block, and the tail end of the block is copied and added at the head of the block as a CP (Cyclic Prefix). In FIG. 3, a format of the frame 34 and transmission blocks used in the present embodiment are shown as an example. Numeral 30 denotes a pilot block including a pilot signal, arranged at the frame head, and numerals 31 to 33 each denote data blocks within the frame, including data signals, which are shown in FIG. 3. Using the pilot block 30, a signal that is predetermined between the transmitter and the receiver 1 is transmitted. Using a waveform of a received pilot symbol 30 and a waveform of a pilot block 30 stored in advance, the receiver 1 carries out the transmission path estimation by a later-described process.

Next, referring to FIG. 2, an operation of the demodulation unit 13 will be described. The CP removal unit 20 delivers, to the DFT processing unit 21, a reception block in which the previously described CP is removed from the digital signal being input from the A/D conversion processing unit 12. The DFT processing unit 21 applies discrete Fourier transform to the digital signal from which the CP has been removed, and generates a reception block in the frequency domain. The DFT processing unit 21 delivers its processing result to the transmission path estimation unit 25 at the timing when the pilot block 30 is processed and to the frequency domain equalization processing unit 22 at the timing when the data blocks 31 to 33 are processed.

The frequency domain equalization processing unit 22 multiplies the reception block in the frequency domain input from the DFT processing unit 21 by equalization coefficients calculated from transmission path estimation values in the frequency domain input from the transmission path estimation unit 25 so as to carry out a process to compensate signal waveform distortion that the signal has undergone through the transmission path. Processing of the transmission path estimation unit 25 will be described later. As an algorithm for the equalization coefficient calculation, known methods based on the zero-forcing criterion or the MMSE (Minimum Mean Square Error) criterion is applicable. For example, when the transmission path estimation value at the k-th subcarrier is denoted by H (k), the reception block in the frequency domain is denoted by R (k), the equalization coefficient is denoted by W (k), and an averaged noise power is denoted by $\sigma^2$, the output y (k) of the frequency domain equalization processing unit 22 in the case where the equalization coefficient is calculated on the basis of the MMSE criterion can be expressed by the following expressions.

$y(k)=W(k)R(k)$ (expression 1)

$W=H(k)^*/(|H(k)|^2+\sigma^2)$ (expression 2)

Here, A* denotes a complex conjugate of the signal A

The processing result of the frequency domain equalization processing unit 22 is delivered to the IDFT processing unit 23. The IDFT processing unit 23 applies the inverse discrete Fourier transform to the reception block after frequency domain equalization input from the frequency domain equalization processing unit 22 so as to convert the reception block into reception block after the equalization in the time domain. The reception block after the equalization in the time domain is input to the symbol decision unit 24. From the reception block after the equalization in the time domain, the symbol decision unit 24 outputs demodulation data serving as an estimation value of a transmission bit sequence.

Figure 4:
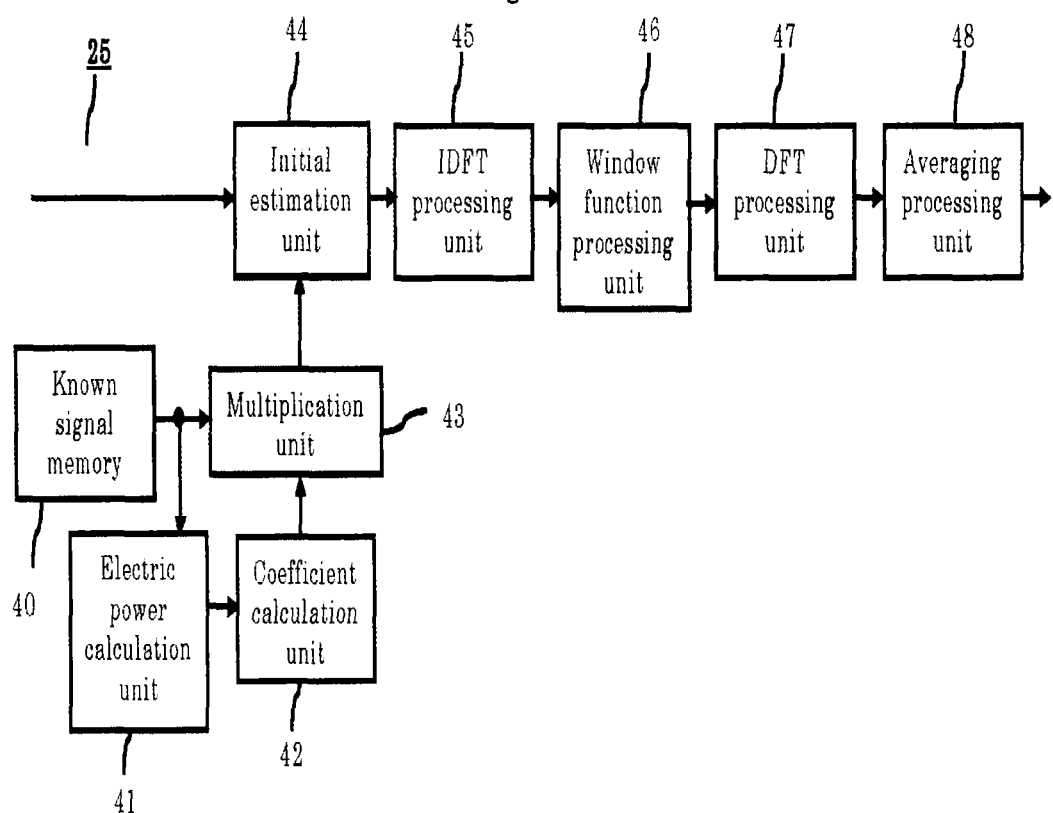
FIG. 4 is a block diagram of a transmission path estimation unit 25 according to Embodiment 1.

Next, an operation of the transmission path estimation processing unit 25 will be described in detail. A configuration of the transmission path estimation unit 25 is shown in FIG. 4. In FIG. 4, numeral 40 denotes a known signal memory, numeral 41 denotes an electric power calculation unit, numeral 42 denotes a coefficient calculation unit, numeral 43 denotes a multiplication unit, numeral 44 denotes an initial estimation unit, numeral 45 denotes an IDFT processing unit, numeral 46 denotes a window function processing unit, numeral 47 denotes a DFT processing unit, and numeral 48 denotes an averaging processing unit.

As described before, a processing result of the discrete Fourier transform that has been applied to the pilot block 30 in the DFT processing unit 21, namely the reception pilot block in the frequency domain, is input to the transmission path estimation unit 25. The reception pilot block in the frequency domain is input to the initial estimation unit 44.

It is configured such that, in the known signal memory 40, a signal after taking a complex conjugate of the frequency domain signal of the pilot block transmitted in the pilot block 30 is stored in advance, and the electric power calculation unit 41 and the multiplication unit 43 read out the signal. Although the description will be made here assuming that the signal after taking a complex conjugate of the frequency domain signal of the pilot block transmitted in the pilot block 30 is stored in the known signal memory 40, the known signal memory 40 may hold the frequency domain signal of the pilot block and a complex conjugate calculation unit (not shown) may calculate its complex conjugate signal.

The electric power calculation unit 41 calculates an electric power value on a subcarrier basis for the frequency domain signal read out from the known signal memory 40 and delivers the value to the coefficient calculation unit 42.

The coefficient calculation unit 42 compares a predetermined threshold X with the electric power value input from the electric power calculation unit 41, and if the electric power value is equal to or larger than the threshold, the unit calculates the inverse of the electric power value as a coefficient, which is delivered to the multiplication unit 43, and if the electric power value is smaller than the threshold, zero is delivered as the coefficient to the multiplication unit 43. Although the description here has been made for a case of determining whether the value is smaller than the threshold or not, it is not limited thereto. It may be determined by whether the value is larger than the threshold or not.

The multiplication unit 43 multiplies the frequency domain signal read out from the known signal memory 40 by the coefficient input from the coefficient calculation unit 42, and the result is delivered to the initial estimation unit 44. Note that, the multiplication unit 43 multiplies the frequency domain signal read out from the known signal memory 40 by the coefficient input from the coefficient calculation unit 42 in such a way that the subcarrier number matches with each other. That is, the frequency domain signal for the k-th subcarrier read out from the known signal memory 40 is multiplied in the multiplication unit 43 by the coefficient calculated in the coefficient calculation unit 42 using the frequency domain signal for the k-th subcarrier.

The threshold X used in the coefficient calculation unit 42 is set in order to determine a subcarrier signal that is not preferably used for the transmission path estimation. In the present embodiment, for example, the threshold X is set to 1.0, and thus the coefficient is set to zero in the coefficient calculation unit 42 for a subcarrier whose electric power value is less than 1.0, and the frequency domain signal is multiplied in the multiplication unit 43 by the coefficient being zero. Thereby, when the transmission path value in the frequency domain is estimated in the later-described process of the initial estimation unit 44, noise enhancement by multiplying the inverse of the electric power value being less than 1.0 can be avoided.

The initial estimation unit 44 obtains an initial transmission path estimation value in the frequency domain by multiplying the reception pilot block in the frequency domain input from the DFT processing unit 21 by the frequency domain signal after the multiplication of the coefficient that is input from the multiplication unit 43.

In the known signal memory 40, as described before, a signal after taking a complex conjugate of the frequency domain signal of the pilot block transmitted in the pilot block 30 is stored. Therefore, in the subcarriers other than the subcarriers that are multiplied by zero as the coefficient owing to the electric power value being less than (or equal to or less than) the threshold, the pilot signal component is eliminated in the processing of the initial estimation unit 44, so that the estimation value of the frequency response in the transmission path can be obtained. Specifically, when P(k) denotes the reception pilot block in the frequency domain for the k-th subcarrier, H(k) denotes the transmission path estimation value for the k-th subcarrier, H0(k) denotes the transmission path response for the k-th subcarrier, and N(k) denotes the noise component for the k-th subcarrier, the processing of the initial estimation unit 44 can be expressed by the following expressions.

$$H(k) = (H0(k)P(k) + N(k)) \times P(k)* / |P(k)|^2 \qquad \text{(expression 3)}$$
$$= H0(k) + N(k)P(k)* / |P(k)|^2 \qquad \text{(expression 4)}$$

Here, (H0(k)P(k)+N(k)) is the data to be input from the DFT processing unit 21, and (P(k)*/|P(k)|²) is the data to be input from the multiplication unit 43.

Note that, in the subcarriers where zero as the coefficient is multiplied in the multiplication unit 43, zero is to be output as the initial transmission path estimation value through the processing of the initial estimation unit 44. The processing result of the initial estimation unit 44 is delivered as an initial transmission estimation value in the frequency domain to the IDFT processing unit 45.

The IDFT processing unit 45 applies the inverse discrete Fourier transform to the initial transmission path estimation value in the frequency domain input from the initial estimation unit 44 and obtains an initial transmission path estimation value in the time domain. The initial transmission path estimation value in the time domain is delivered to the window function processing unit 46.

The window function processing unit 46 multiplies the initial transmission path estimation value in the time domain by a predetermined window function, and thus the initial transmission path estimation value in the time domain is weighted. In general, the CP length is often designed to be longer than the maximum delay time in the transmission path response in the time domain. Therefore, the window function processing unit 46 in the present embodiment adopts a window function in which samples having the same size as the CP length take one as a weighting coefficient and the other samples take zero as a weighting coefficient. Due to the process, a signal that is assumed not to include a significant value as the transmission path response in the time domain and to be dominated by a noise component can be replaced by zero, bringing about the effect to remove the noise from the estimation value. The processing result of the window function processing unit 46 is delivered to the DFT processing unit 47.

The DFT processing unit 47 applies the discrete Fourier transform to the initial transmission path estimation value in the time domain that is input from the window function processing unit 46 after multiplication of the window function, and obtains a transmission path estimation value in the frequency domain. The transmission path estimation values for the subcarriers that have been zero at the output stage of the initial estimation unit 44 are interpolated by a series of processing from the IDFT processing unit 45 to the DFT processing unit 47, so that the transmission path estimation values in the frequency domain for the entire subcarriers can be obtained, at the output of the DFT processing unit 47. The processing result of the DFT processing unit 47 is delivered to the averaging processing unit 48.

The averaging processing unit 48 averages the transmission path estimation values in the frequency domain estimated for each pilot block in the above described processing between different pilot blocks in the time direction, and suppresses the effect of noise. Although an arbitrary averaging method can be adopted, a simple average is employed in the present embodiment in which the transmission path estimation values in the frequency domain estimated for a plurality of pilot blocks are added in phase, and then the result is divided by the number of pilot blocks. The processing result of the averaging processing unit 48 is delivered to the frequency domain equalization processing unit 22 of FIG. 2, and is to be used to calculate the equalization coefficient for the frequency equalization with respect to the reception block, as described before.

As described above, in the present embodiment, it is configured such that the electric power value for each subcarrier is calculated in the electric power calculation unit 41 for the frequency domain signal read out from the known signal memory 40 in the transmission path estimation unit 25, and the electric power value for each subcarrier is compared with the threshold in the coefficient calculation unit 42, and then subcarriers whose electric power values are smaller than the threshold are multiplied by zero as the coefficient so as not to use those subcarriers for the initial transmission path estimation in the initial transmission path estimation unit 44. Further, it is configured such that the transmission path estimation values that are zero at the output of the initial estimation unit 44, for the subcarriers in the frequency domain, are interpolated by a series of processing from the IDFT processing unit 45 to the DFT processing unit 47 in the following stage of the initial estimation unit 44. Thus, the transmission path estimation in the frequency domain can be realized by using only signals that are high in subcarrier electric power and accurate in the transmission path estimation, so that satisfactory communication performance can be realized with a simple configuration.

Note that, in the present embodiment, it is configured such that the electric power values for each subcarrier for the signals stored in advance in the known memory 40 are compared with the threshold, and the coefficient to be multiplied at the multiplication unit 43 is determined. In contrast, it may be configured such that the signals after the multiplication of the coefficient are stored in the known signal memory 40, and the signals in the known signal memory 40 are directly read out from the initial estimation unit 44. In this case, the electric power calculation unit 41, the coefficient calculation unit 42, and the multiplication unit 43 can be omitted, so that, in a case where a waveform of the pilot block to be used for the transmission path estimation is fixed, the same performance is realized while the circuit scale is reduced.

Further, in the present embodiment, it is configured such that signals read out from the known signal memory 40 are multiplied in the multiplication unit 43 by the coefficient from the coefficient calculation unit 42. However, the configuration is not necessarily limited to the above, and it may be configured such that, for example, the signals from the DFT processing unit 21 that are input to the initial estimation unit 44 are multiplied by the coefficient.

Furthermore, there is no need to fix the number of the threshold to one in the coefficient calculation unit 42 as described in the present embodiment, and it may be configured such that a plurality of thresholds is defined and each of plural coefficients corresponding to each threshold is prepared. For example, it may be configured such that subcarriers whose electric power values are smaller than 0.5 are replaced with zero and subcarriers whose electric power values are equal to or larger than 0.5 and smaller than one are multiplied by 0.5. Thereby, subcarriers that have extremely low electric power values and by which accuracy in the transmission path estimation cannot be expected are eliminated, and the half-weighted transmission path estimation results can be adopted from subcarriers that may produce a satisfactory result when they are taken into consideration in the transmission estimation, depending on the communication environment.

In the present embodiment, although it has been described that the electric power value is calculated on a subcarrier basis in the electric power calculation unit 41, it is not limited to that. It may be electric power information calculated on a subcarrier basis, and the electric power information includes the electric power value and the SNR (signal to noise power ratio).

Also, in the present embodiment, it is configured such that the interpolation processing of the transmission path estimation value in the frequency domain by the use of the IDFT and the DFT is employed in the subsequent processing of the initial estimation unit 44. However, a simple linear interpolation, for example, may be performed in the frequency direction, or a second-order or a higher order interpolation may be used. Apart from these, an arbitrary method is applicable.

Embodiment 2

Next, Embodiment 2 according to the present invention will be described. The point in the present embodiment different from Embodiment 1 is the configuration as shown in FIG. 5 in which the data once demodulated at the symbol decision unit 24-*a* in the demodulation unit, which is regarded spuriously as a known pilot block, is input to the transmission path estimation unit through the DFT, and the transmission path estimation is carried out repeatedly.

Figure 5:
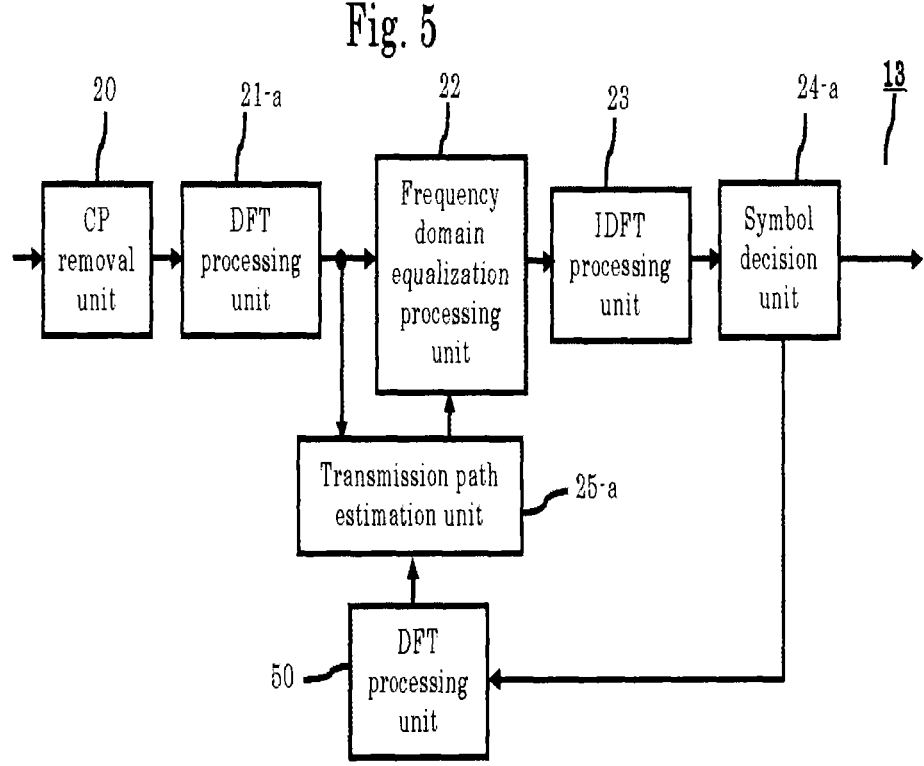
FIG. 5 is a block diagram of a demodulation unit 13 according to Embodiment 2.

A configuration example of the demodulation unit 13 according to Embodiment 2 is shown in FIG. 5. It is noted that components having the same functions are denoted by the same numerals as those used in FIG. 2, and descriptions thereof will be omitted. In FIG. 5, numeral 21-*a* denotes a DFT processing unit, numeral 24-*a* denotes a symbol decision unit, numeral 25-*a* denotes a transmission path estimation unit, and numeral 50 denotes a DFT processing unit. In addition, in contrast to the symbol decision unit 24 of FIG. 2, the symbol decision unit 24-*a* further has a function for outputting demodulated data being a symbol decision value to the DFT processing unit 50.

In the receiver 1 according to Embodiment 2, the DFT processing unit 21-*a* delivers both the reception pilot block in the frequency domain and the received data blocks in the frequency domain to the transmission path estimation unit 25-*a*. In the first reception processing, the transmission path estimation in the frequency domain is carried out, with the same processing as that in Embodiment 1, using the reception pilot block in the transmission path estimation unit 25-*a*.

Next, using the estimated transmission path estimation value, the frequency domain equalization is carried out in the frequency equalization processing unit 22 so as to compensate signal distortion on the received data blocks.

And then, after a decision value for a block of data is obtained from the symbol decision unit 24-*a*, an estimation value of the transmission symbol is delivered to the DFT processing unit 50, and is converted into a decision value in the frequency domain, which is then delivered to the transmission path estimation unit 25-*a*.

Using a later-described processing, the transmission path estimation unit 25-*a* carries out the transmission path estimation by the use of the decision value in the frequency domain, and the transmission path estimation value with improved accuracy in the frequency domain is delivered to the frequency domain equalization unit 22.

Using the transmission path estimation value with improved accuracy in the frequency domain, the frequency domain equalization unit 22 compensates the signal distortion on the received data blocks again.

Figure 6:
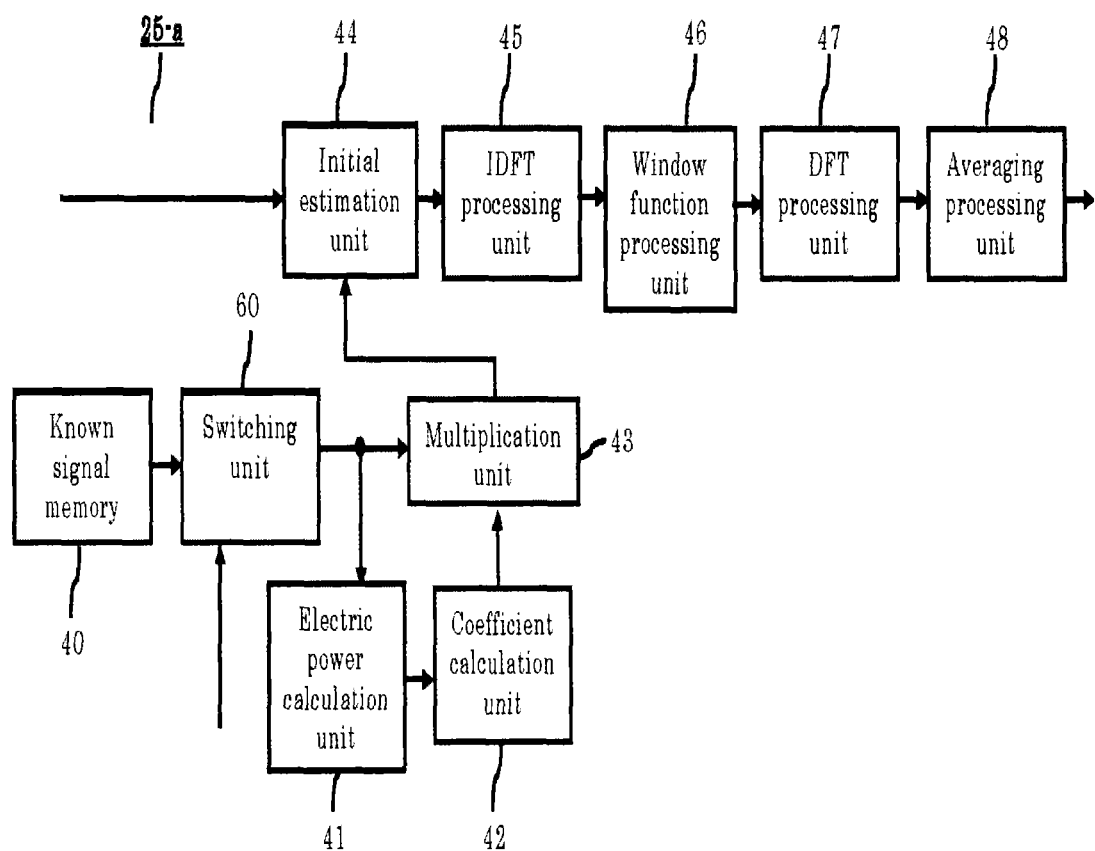
FIG. 6 is a block diagram of a transmission path estimation unit 25-*a* according to Embodiment 2.

Next, the processing of the transmission path estimation unit 25-*a* will be described. A configuration example of the transmission path estimation unit 25-*a* according to Embodiment 2 is shown in FIG. 6. It is noted that components having the same functions are denoted by the same numerals as those used in FIG. 4, and descriptions thereof will be omitted.

In FIG. 6, numeral 60 denotes a switching unit. The signal from the known signal memory 40 and the signal from the DFT processing unit 50 in FIG. 5 are input to the switching unit 60. In addition, the initial estimation unit 44 of FIG. 6 has the same function as that of the initial estimation unit 44 of FIG. 4 and can receive both the reception pilot block in the frequency domain and the received data blocks as the input signals from the DFT processing unit 21-*a* of FIG. 5.

The transmission path estimation unit 25-*a*, at the timing when it carries out processing on the reception pilot block in the frequency domain input from the DFT processing unit 21-*a*, inputs the signal of the known signal memory 40 to the switching unit 60, and carries out the transmission path estimation processing in the frequency domain using the reception pilot block by the processing described before.

In contrast, the transmission path estimation unit, at the timing when it carries out processing on the received data blocks in the frequency domain input from the DFT processing unit 21-*a*, inputs the decision value in the frequency domain input from the DFT processing unit 50 of FIG. 5 to the switching unit 60, and carries out the transmission path estimation in the frequency domain by carrying out the same processing as described in Embodiment 1 by the use of both the received data blocks in the frequency domain and the decision values in the frequency domain, regarding the decision values in the frequency domain as the known pilot blocks.

After the transmission path estimation processing using the decision values of the data blocks described above is repeated a predetermined number of times, the estimation value of the transmission bit sequence output from the symbol decision unit 24-*a* is delivered to the decoding unit 14 of FIG. 1, and then the conclusive data is obtained.

In Embodiment 2 described above, by adopting the configuration in which not only the transmission path in the frequency domain is estimated using the pilot block, but also the decision values of the data blocks are input to the transmission path estimation unit 25-*a*, the transmission path estimation can be carried out repeatedly by making use of the decision values on the data blocks, which are used like the known pilot block. Thereby, accuracy in the transmission path estimation can be improved, so that communication quality can be improved.

Further, in the transmission path estimation processing, in a case where there is a plurality of demodulated signals, using the latest demodulated signal can lead to an improvement in the communication quality.

In the present embodiment, although a configuration in which the output from the symbol decision unit 24-*a* is delivered to the transmission path estimation unit 25-*a* is adopted, the configuration is not limited thereto and a configuration in which the transmission path estimation is carried out repeatedly using the decoded result in the decoding unit of FIG. 1 may be adopted. In this case, for example, a method may be adopted in which, using the same encoding method as that used in the transmission side, error correcting coding is applied again to the output of the decoding unit 14, the result of which is delivered to the DFT processing unit 50 of FIG. 5, or a method may be adopted in which, using a soft input/soft output decoder such as the MAP (Maximum A Posteriori) decoder or the SOVA (Soft Output Viterbi Algorithm) decoder widely known as decoding units 14, a soft output from the decoding unit is input to the DFT processing unit 50 of FIG. 5.

Further, in the present embodiment, although the number of the transmission path estimation is predetermined, it may accordingly be changed during reception processing. For example, at the timing when an error in the output of the symbol decision unit 24-*a* is regarded as being sufficiently reduced, the transmission path estimation may be interrupted at the less number of repetition than the predetermined number. Furthermore, the decision may be made using a parity bit such as the CRC (Cyclic Redundancy Check) as a criterion for the interruption of the repetitive transmission path estimation, or the criterion for the decision may be the reliability of a decision value using a well-known soft decision method as the symbol decision unit 24-*a*.

Still further, in the present embodiment, the configuration is adopted in which the repetitive transmission path estimation using the decision values is carried out, and the frequency domain equalization to which the result of the repetitive transmission path estimation is applied is executed on the data blocks that have already been decided, leading to the enhancement of the reception performance. In contrast, for example, it may be configured such that the repetitive result of the transmission path estimation is not repeatedly applied to the same data block and is reflected on the equalization coefficient of the frequency domain equalization when the next data block is received. In this case, although the errors in the data blocks on which the decisions are made once by carrying out the frequency domain equalization cannot be improved, the transmission path estimation value with enhanced accuracy can be applied to the following data blocks, and thus it is expected that the reception performance is to be improved with increasing number of data block processing. This configuration is suitable for realizing satisfactory communication performance in the situation where the delay in the processing of the receiver 1 is required to be small.

Embodiment 3

Next, Embodiment 3 according to the present invention will be described. The point in the present embodiment different from Embodiment 1 and Embodiment 2 is the configuration in which the receiver 1 receives a plurality of different signals and the transmission path estimation and the demodulation can be carried out for each signal.

Figure 7:
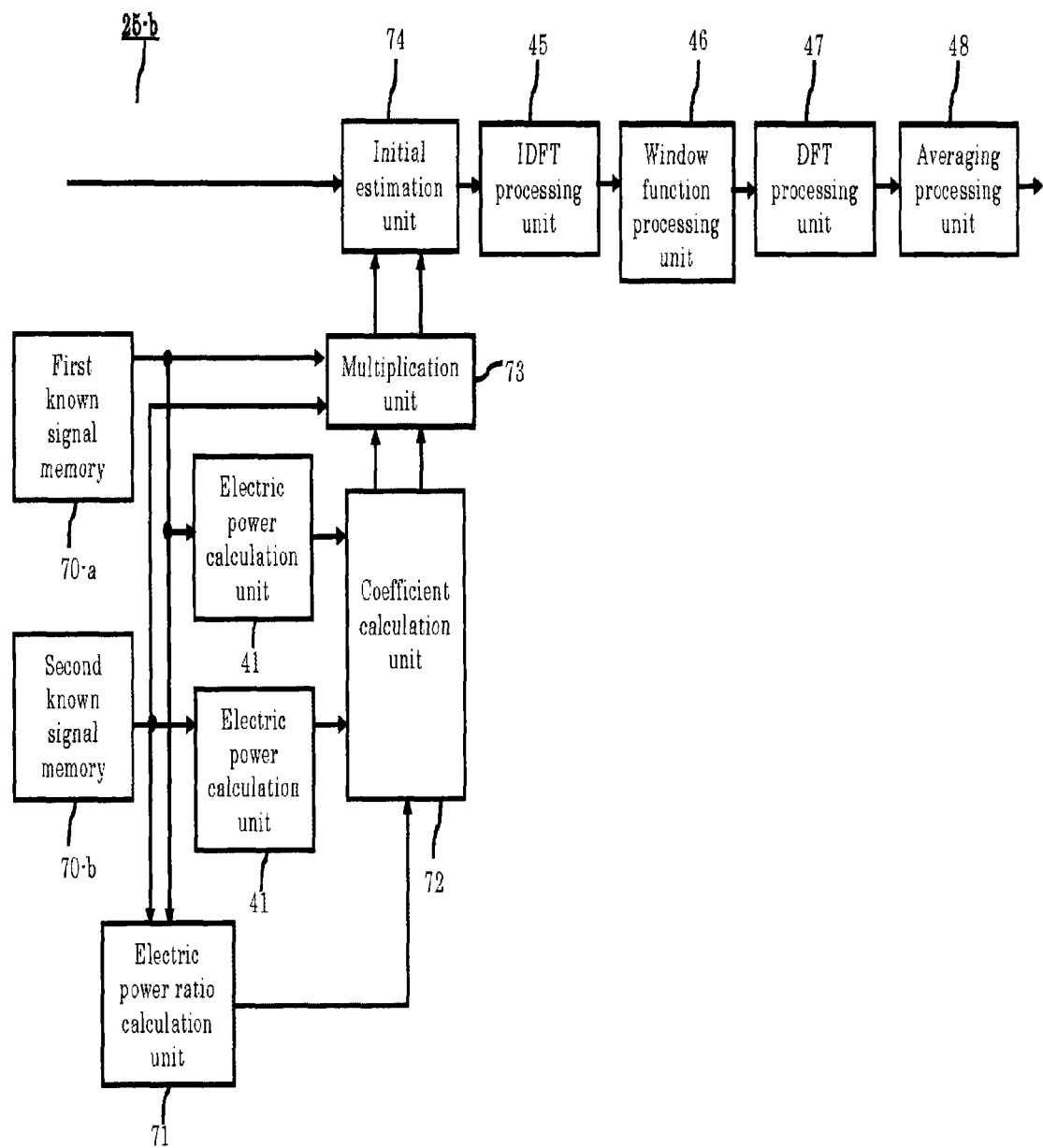
FIG. 7 is a block diagram of a transmission path estimation unit 25-*b* according to Embodiment 3.

In FIG. 7, a configuration example of the transmission path estimation unit 25-*b* according to Embodiment 3 is shown. It is noted that components in FIG. 7 having the same functions are denoted by the same numerals as those used in FIG. 4, and descriptions thereof will be omitted. In FIG. 7, numeral 70-*a* denotes a first known signal memory, numeral 70-*b* denotes a second known memory, numeral 71 denotes an electric power ratio calculation unit, numeral 72 denotes a coefficient calculation unit, and numeral 73 denotes a multiplication unit.

In the present embodiment, it is assumed that two transmitters (first transmitter, second transmitter (not shown)) transmit different signals at the same time and in the same frequency, and the receiver 1 demodulates each of the transmitted signals separately. In addition, each transmitter transmits a different signal in the pilot block 30. In FIG. 7, in the first known signal memory 70-*a*, a signal after taking a complex conjugate of a frequency domain signal of the pilot block transmitted in the pilot block 30 of the first transmitter is stored in advance, and in the second known signal memory 70-*b*, a signal after taking a complex conjugate of a frequency domain signal of the pilot block transmitted in the pilot block 30 of the second transmitter is stored in advance.

The electric power ratio calculation unit 71 calculates an electric power ratio Z on a subcarrier basis for signals in the frequency domain read out from the first known signal memory 70-*a* and the second known signal memory 70-*b*, and delivers the result to the coefficient calculation unit 72. Here, the electric power ratio Z is expressed by the following expression.

Electric power ratio Z=(the electric power of the frequency domain signal read out from the first known signal memory 70-*a*/the electric power of the frequency domain signal read out from the second known signal memory 70-*b*)

The coefficient calculation unit 72 compares a predetermined threshold for the electric power ratio Z with the electric power ratio Z input from the electric power ratio calculation unit 71, and calculates a coefficient (hereinafter, referred to as coefficient 1) for a frequency domain signal read out from the first known signal memory 70-*a* and a coefficient (hereinafter, referred to as coefficient 2) for a frequency domain signal read out from the second known signal memory 70-*b*. In the present embodiment, as an example of the threshold and the method of calculating the coefficients, in the case where the relation: $0.5 <$ electric power ratio $Z < 2.0$, is satisfied, both the coefficient 1 and the coefficient 2 are set to zero, and otherwise, the inverse of the electric power for each of the frequency domain signals is calculated. The calculated coefficient 1 and coefficient 2 are delivered to the multiplication unit 73.

The multiplication unit 73 multiplies the frequency domain signal read out from the first known signal memory 70-a by the coefficient 1 input from the coefficient calculation unit 72, and multiplies the frequency domain signal read out from the second known signal memory 70-b by the coefficient 2 input from the coefficient calculation unit 72. The signals after multiplication of the coefficients are delivered to the initial estimation unit 74.

By multiplying the reception pilot block in the frequency domain input from the DFT processing unit 21 by the frequency domain signals after multiplication of the two type coefficients, input from the multiplication unit 73, the initial estimation unit 74 obtains the initial transmission path estimation value in the frequency domain for the signal transmitted from the first transmitter and the initial transmission path estimation value in the frequency domain for the signal transmitted from the second transmitter.

Afterward, the subsequent processing including the processing at the IDFT processing unit 45 is separately carried out for the two initial transmission path estimation values in the frequency domain, so that the transmission path estimation for the first transmitter and the second transmitter is completed. Using the obtained transmission path estimation values, the signal transmitted from the first transmitter and the signal transmitted from the second transmitter are separately demodulated.

In Embodiment 3, as described above, it is configured such that known signal memories are prepared for the number of signals to be demodulated and the coefficient calculation is carried out using the electric power ratio of the frequency domain signal calculated in the electric power ratio calculation unit. As a result, the initial transmission path estimation can be carried out without using subcarrier signals whose pilot blocks interfere intensely with each other among transmitted signals, so that a plurality of signals transmitted from different transmitters can be demodulated accurately.

Note that, in the present embodiment, although the description has been made assuming that signals are transmitted from the two different transmitters, this can be applied to the case where a single transmitter equipped with two transmission antennas and a different signal is transmitted from each transmission antenna.

In addition, although the coefficient calculation unit 72 is configured to carry out processing by comparing the calculated result of the electric power ratio calculation unit 71 with the threshold, the configuration is not limited thereto, and the threshold for the electric power ratio described in the present embodiment may be used in combination with the threshold for the electric power value for each subcarrier as in the coefficient calculation unit 42 in Embodiment 1. In this case, it may be configured such that, as a first step, the coefficient is set to zero when the threshold for the electric power value for each subcarrier is not satisfied, and then the coefficient is calculated by further applying the threshold for the electric power ratio to those that satisfy the threshold for the electric power value. In the above case, since the electric power ratio is calculated only for those that satisfy the threshold for the electric power value, the amount of calculation for the electric power ratio can be reduced.

Further, in the present embodiment, although an example is described in which there are two transmission sources (transmitters or transmission antennas) of the transmission signals, it is not limited thereto, and it can be applied to the case where there are three or more transmission sources. In this case, electric power ratios between two signals is calculated for all cases in the electric power ratio calculation unit 71 and coefficient calculation can be carried out by comparing each electric power ratio with the threshold individually in the coefficient calculation unit 72. Furthermore, as described above, the threshold for the electric power value may be used in combination with the threshold for the electric power ratio. In addition, there is no restriction for the number of coefficients being set to zero, and there may be a subcarrier for which the coefficient is set to zero for all transmission sources when the threshold is not satisfied. Conversely, there may be a case where the electric power value of a subcarrier becomes the coefficient for all transmission sources.

Still further, in the present embodiment, although it is configured such that the coefficient calculation and the coefficient multiplication are carried out in the individual process of the transmission path estimation for the signal in the frequency domain of the pilot block stored in the known signal memory, it may be configured such that prior processing to the initial transmission path estimation is carried out in advance to obtain a calculation result, and the calculation result is stored in the known signal memory.

EXPLANATION OF REFERENCE CHARACTERS 1 receiver, 10 antenna, 11 high-frequency analog signal processing unit, 12 A/D conversion processing unit, 13 demodulation unit, 14 decoding unit, 20 CP removal unit, 21 DFT processing unit, 22 frequency domain equalization processing unit, 23 IDFT processing unit, 24 symbol decision unit, 25 transmission path estimation unit, 30 pilot block, 31-33 data block, 34 frame format, 40 known signal memory, 41 electric power calculation unit, 42 coefficient calculation unit, 43 multiplication unit, 44 initial estimation unit, 45 IDFT processing unit, 46 window function processing unit, 47 DFT processing unit, 48 averaging processing unit, 21-a DFT processing unit, 24-a symbol decision unit, 25-a transmission path estimation unit, 50 DFT processing unit, 60 switching unit, 70-a first known signal memory, 70-b second known signal memory, 72 coefficient calculation unit, 73 multiplication unit, 74 initial estimation unit

The invention claimed is:

1. A receiver that estimates a frequency response of a transmission path using a first pilot signal stored in advance and a second pilot signal received, comprising:
   an electric power information calculator that calculates electric power information of the first pilot signal on a subcarrier basis;
   a coefficient calculator that calculates a coefficient corresponding to a subcarrier on the basis of comparison between the electric power information calculated by the coefficient calculator and a predetermined threshold;
   a multiplier that multiplies a signal component of the first pilot signal corresponding to each subcarrier by the coefficient corresponding to each subcarrier;
   a transmission path estimator that calculates an estimation value of a frequency response of a transmission path on the basis of the first pilot signal multiplied in the multiplier and the second pilot signal received from a transmitter; and
   an interpolator that performs interpolation processing for the estimation value calculated.

2. The receiver according to claim 1, wherein the second pilot signal is a complex conjugate of the first pilot signal.

3. The receiver according to claim 1, wherein, in the coefficient calculation by the coefficient calculator, the coefficient is set to zero when the electric power information is smaller than the threshold.

4. The receiver according to claim 1, wherein the transmission path estimator can calculate an estimation value of a frequency response of the transmission path on the basis of a demodulated signal that is demodulated by the receiver and a data signal received from the transmitter.

5. The receiver according to claim 4, wherein, if there is a plurality of the demodulated signals, the transmission path estimator employs a demodulated signal which has been most recently demodulated.

6. The receiver according to claim 5, further comprising
a switch that can deliver either of the first pilot signal or the demodulated data signal to the multiplier.

7. The receiver according to claim 1, wherein the electric power information is an electric power value.

8. The receiver according to claim 1, wherein the electric power information is a ratio between signal power and noise power.

9. A receiver in which a frequency response of a transmission path is estimated using a first pilot signal stored in advance and a second pilot signal received, and a third pilot signal stored in advance and a fourth pilot signal received, the receiver comprising:
- a first electric power value calculator that calculates an electric power value of the first pilot signal on a subcarrier basis;
- a second electric power value calculator that calculates an electric power value of the third pilot signal on the subcarrier basis;
- an electric power ratio calculator that calculates electric power ratio that is a value by dividing an electric power value calculated from the first electric power calculator by an electric power value calculated from the second electric power calculator;
- a coefficient calculator that calculates a first coefficient for the first pilot signal and a second coefficient for the third pilot signal on the basis of comparison between the electric power ratio calculated from the electric power ratio calculator and a predetermined threshold;
- a multiplier that multiplies a signal component of the first pilot signal corresponding to each subcarrier by the first coefficient corresponding to each subcarrier and that multiplies a signal component of the third pilot signal corresponding to each subcarrier by the second coefficient corresponding to each subcarrier;
- a transmission path estimator that calculates an estimation value of a frequency response in a first transmission path on the basis of the first pilot signal multiplied by the first coefficient in the multiplier and the second pilot signal received from a transmitter and that calculates an estimation value of a frequency response in a second transmission path on the basis of the third pilot signal multiplied by the second coefficient in the multiplier and the fourth pilot signal received from the transmitter; and
- an interpolator that carries out interpolation processing for the calculated estimation value.

10. A method of estimating in a receiver a frequency response of a transmission path by the use of a first pilot signal stored in advance and a second pilot signal received, the method comprising;
- an electric power information calculation step of calculating electric power information of the first pilot signal on a subcarrier basis;
- a coefficient calculation step of calculating a coefficient corresponding to a subcarrier on the basis of comparison between the electric power information calculated in the electric power information calculation step and a predetermined threshold;
- a multiplication step of multiplying a signal component of the first pilot signal corresponding to each subcarrier by the coefficient corresponding to each subcarrier;
- a transmission path estimation step of calculating an estimation value of a frequency response of a transmission path on the basis of the first pilot signal multiplied in the multiplication step and the second pilot signal received from a transmitter; and
- an interpolation processing step of carrying out interpolation processing for the calculated estimation value.

* * * * *